United States Patent [19]

Sibbet

[11] Patent Number: 5,699,705
[45] Date of Patent: Dec. 23, 1997

[54] POWERED CIRCULAR SAW RETENTION APPARATUS FOR RETRACTABLE SAW BLADE GUARD

[76] Inventor: Donald Dale Sibbet, 10912 France Ave. S., Bloomington, Minn. 55431

[21] Appl. No.: 548,942

[22] Filed: Dec. 4, 1995

[51] Int. Cl.⁶ .............................. B23D 45/16; B26D 7/22
[52] U.S. Cl. .................... 83/13; 30/391; 83/397; 83/478; 83/520
[58] Field of Search .................... 83/478, 13, 520, 83/397; 30/390, 391, 373, 286; 451/451, 454, 457

[56] References Cited

U.S. PATENT DOCUMENTS

| | | | |
|---|---|---|---|
| 2,722,246 | 11/1955 | Arnoldy | 30/391 |
| 2,790,468 | 4/1957 | Wilhide | 30/391 |
| 2,963,056 | 12/1960 | Rickford | 30/391 |
| 3,063,481 | 11/1962 | Sutherland | 30/391 |
| 3,410,325 | 11/1968 | Winther | 30/391 |
| 3,613,748 | 10/1971 | DePue | 30/373 |
| 3,703,654 | 11/1972 | Karubian | 30/390 |
| 3,805,639 | 4/1974 | Peter | 30/391 |
| 4,257,297 | 3/1981 | Nidbella | 83/520 |
| 4,672,746 | 6/1987 | Zeilenga | 83/478 |
| 4,693,008 | 9/1987 | Velie | 30/391 |
| 4,875,398 | 10/1989 | Taylor et al. | 83/478 |
| 5,075,976 | 12/1991 | Young | 30/391 |
| 5,375,495 | 12/1994 | Bosten et al. | 30/388 |
| 5,461,790 | 10/1995 | Olstowski | 30/391 |
| 5,531,147 | 7/1996 | Serban | 83/478 |

FOREIGN PATENT DOCUMENTS

| | | | |
|---|---|---|---|
| 2832693 | 2/1980 | Germany | 30/390 |
| 810438 | 3/1981 | U.S.S.R. | 30/391 |
| 966065 | 8/1964 | United Kingdom | 30/390 |

Primary Examiner—Kenneth E. Peterson
Assistant Examiner—Sean A. Pryor

[57] ABSTRACT

A retention apparatus for an electrically powered hand-held circular saw having a retractable lower saw blade guard, that holds the lower saw blade guard in the retracted position as long as the power on/off switch is activated. This lower saw blade guard holder enables the saw operator to readily manipulate the saw with one hand while using the other hand to improve the safety environment of the cutting action, such as holding the material to be cut, or keeping the power cord out of the path of the saw during the cutting activity. In one embodiment, the lower saw blade guard holder comprises an electromagnet, wired to the power on/off switch, which holds a section of ferromagnetic material on the lower saw blade guard. Another embodiment of this invention has the lower saw blade guard holder mechanically latched by a latch that is mechanically coupled to the power on/off switch. In one embodiment, the lower saw blade guard holder also contains a lamp for lighting up the material being cut.

20 Claims, 10 Drawing Sheets

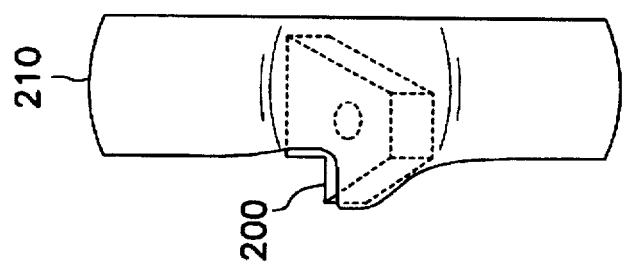
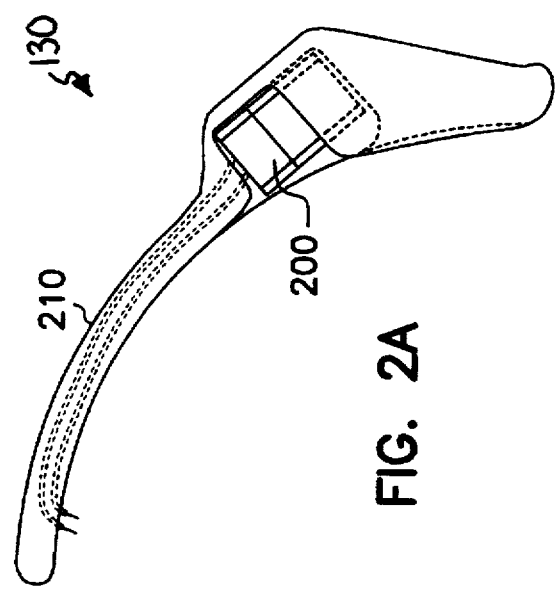
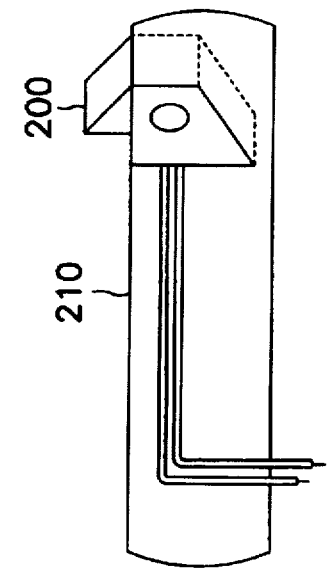
FIG. 2B
FIG. 2A
FIG. 2C

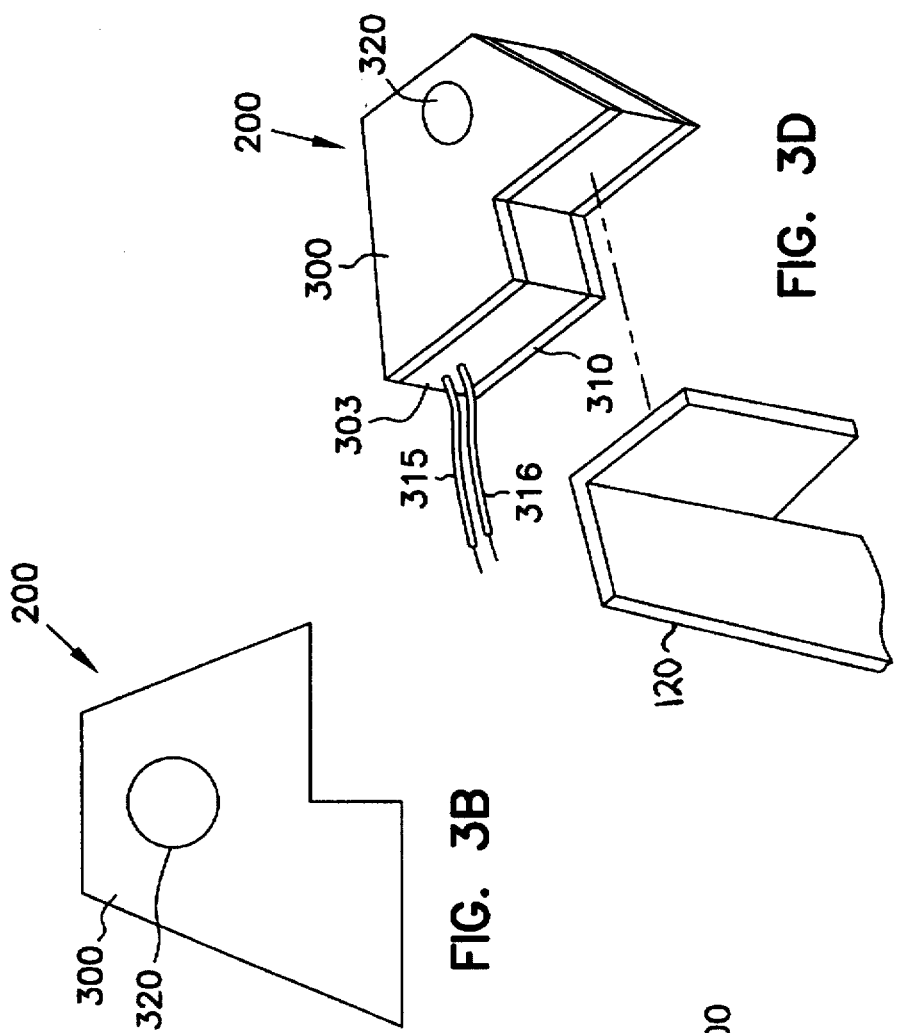
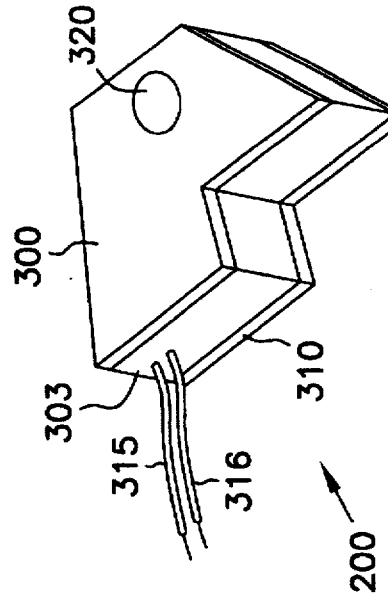
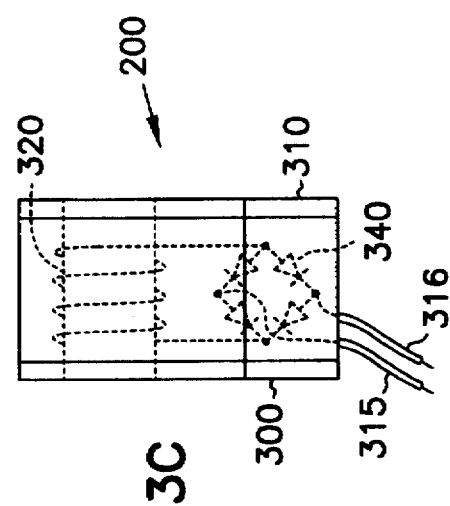

POWERED CIRCULAR SAW RETENTION APPARATUS FOR RETRACTABLE SAW BLADE GUARD

FIELD OF THE INVENTION

The present invention relates to electrically powered handtools and more specifically to hand-held circular saws having a retractable saw blade guard.

BACKGROUND OF THE INVENTION

Hand-held electrically powered circular saws (also known as "Skil Saws") are conventional tools having an electrically powered motor, an electrical switch to turn the motor on or off, a circular saw blade for curing non-ferrous or ferrous material with the appropriate saw blade, a flat base assembly that maintains the curing angle between the saw blade and the material being cut, and an adjustment mechanism that allows the angle of the saw blade to the material being cut to be varied. An electrically-powered circular saw must apply two forces: a rotational force applied by the electric motor to turn the saw blade, and a longitudinal force applied by the operator to push the blade through the material being cut.

One problem with conventional circular saws is a binding action that sometimes occurs when the blade is at an angle less than 90-degrees from the base assembly, for example, when the operator is trying to cut at a 45-degree angle (i.e., a bevelled or compound bevelled cut). The retractable lower saw blade guard is spring loaded and bears down on the material being cut. When the cutting angle is less than 90-degrees, the lower saw blade guard can impart a sideways force on the material, thus pushing the material being cut into the saw blade, causing a binding action that can prevent the operator from pushing the saw through the material being cut, or can cause the circular saw to violently interact with the material being cut, a dangerous condition commonly known as "kickback".

Various approaches can be utilized by the operator to overcome or minimize this binding action. Moving the saw at a slower rate of cutting through the material can reduce this problem. However, the correct travel rate can be learned only through a trial-and-error procedure on each cut. Another technique is for the operator to use a second hand to hold the lower saw blade guard in the retracted position while cutting the material. This is usually unattainable in the majority of conditions when an operator has to cut through material using a circular saw. This technique can be used only if the material is securely fastened. Further, it can also be dangerous for the operator to manually hold the blade guard, since the operator is contorted and using both hands on the saw, but only one hand is controlling the saw. Occasionally, an operator will alter the action of the lower saw-blade guard of a circular saw so that the lower saw blade remains in the retracted condition, for example, by taping it into the retracted position. This is also a safety nightmare, as the saw blade is no longer covered after the saw is finished cutting material (for example, if the saw jumps out of the operators hand due to kickback) but when the blade is still rotating due to angular momentum. If the saw has jumped loose due to kickback, and the lower saw blade guard remains retracted, the exposed moving blade poses an extreme danger to people. Even if the operator holds on to the saw handle, it is likely that, not realizing the blade is still moving, the operator will put the saw down and the moving blade will cause the saw to skip across the floor, possible cutting a person or at least damaging property.

What is needed is a lower saw blade guard that does not bear on the material being cut, but covers the saw blade whenever there is no material to be cut.

SUMMARY OF THE INVENTION

The invention is characterized by certain novel features of a lower saw blade guard retention system that keeps the lower saw blade guard in the retracted position as long as the on/off switch is held in the on position. When the switch is released or allowed to go to the off position, the lower saw blade guard covers the saw blade.

The lower saw blade guard retention system comprises a lower saw blade guard holder that is coupled to the power switch wherein the lower saw blade guard holder retains the lower saw blade guard in a retracted position (i.e., exposing the blade) when the power switch is activated and releases the lower saw blade guard to a closed position (i.e., covering the blade) when the power switch is deactivated.

In one embodiment, the lower saw blade guard holder comprises an electromagnet that is activated when the power switch is activated, and deactivated when the power switch is deactivated. In this embodiment, a portion of ferrous material fastened to the lower saw blade guard is moved into contact with the electromagnet by the operator and is held at the electromagnet by the magnetic force of the electromagnet as long as the power switch is activated. When the power switch is deactivated, the electromagnet is deactivated, and the lower saw blade guard returns to the default position of covering the saw blade.

BRIEF DESCRIPTION OF THE DRAWINGS

FIGS. 2A, 2B, & 2C arc a side, front, and bottom view, respectively, of one embodiment of the lower saw blade guard retention apparatus comprising an electromagnet.

FIGS. 3A, 3B, C, & 3D arc an isometric, top, side, and operational view, respectively, of the electromagnet 200 and its parts.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Figure 1A:
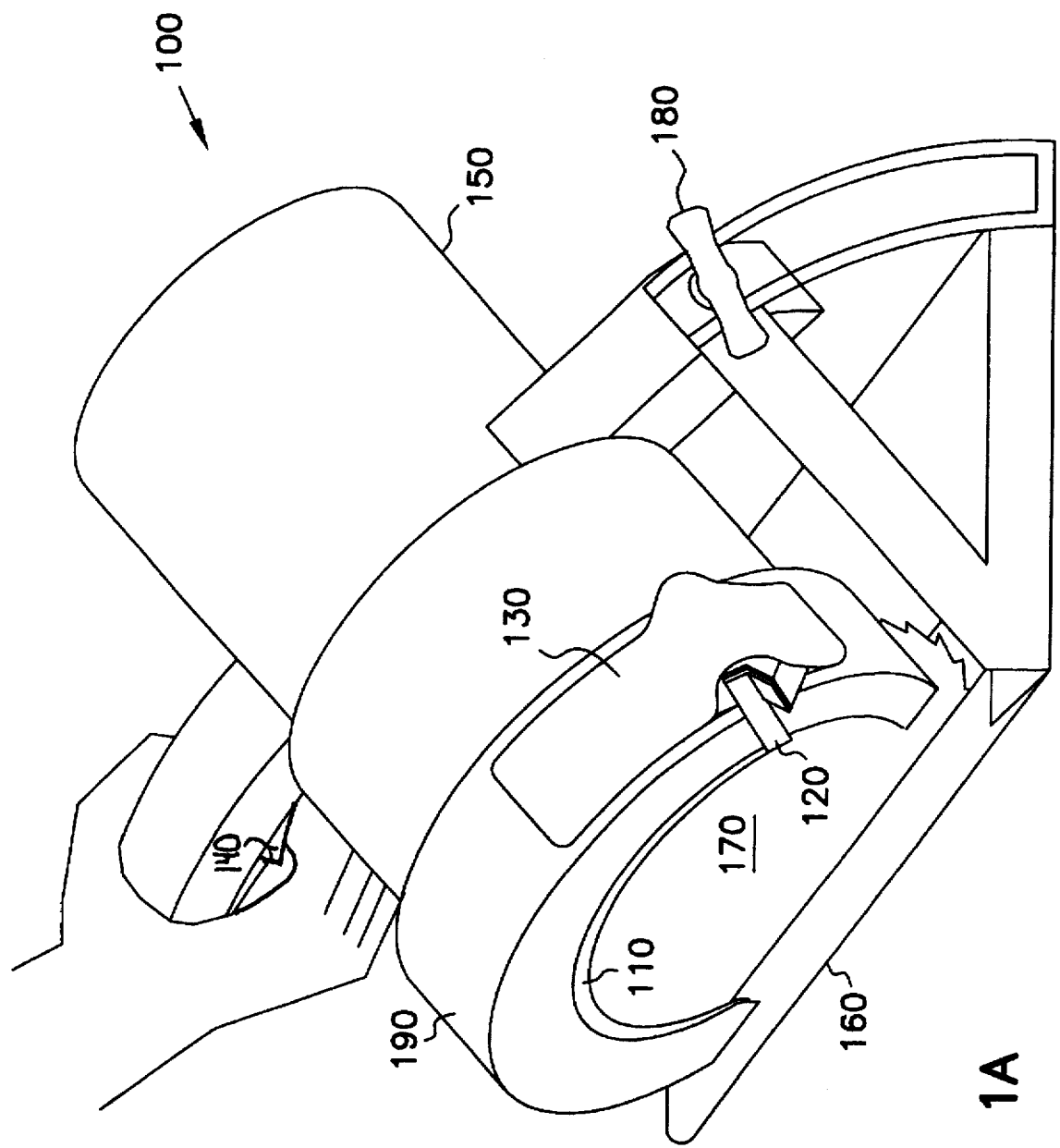
FIGS. 1A & 1B are an isometric and front view, respectively, of an electrically powered hand-held circular saw according to the present invention with a lower saw blade guard holder present on the upper saw blade guard.
Figure 1B:
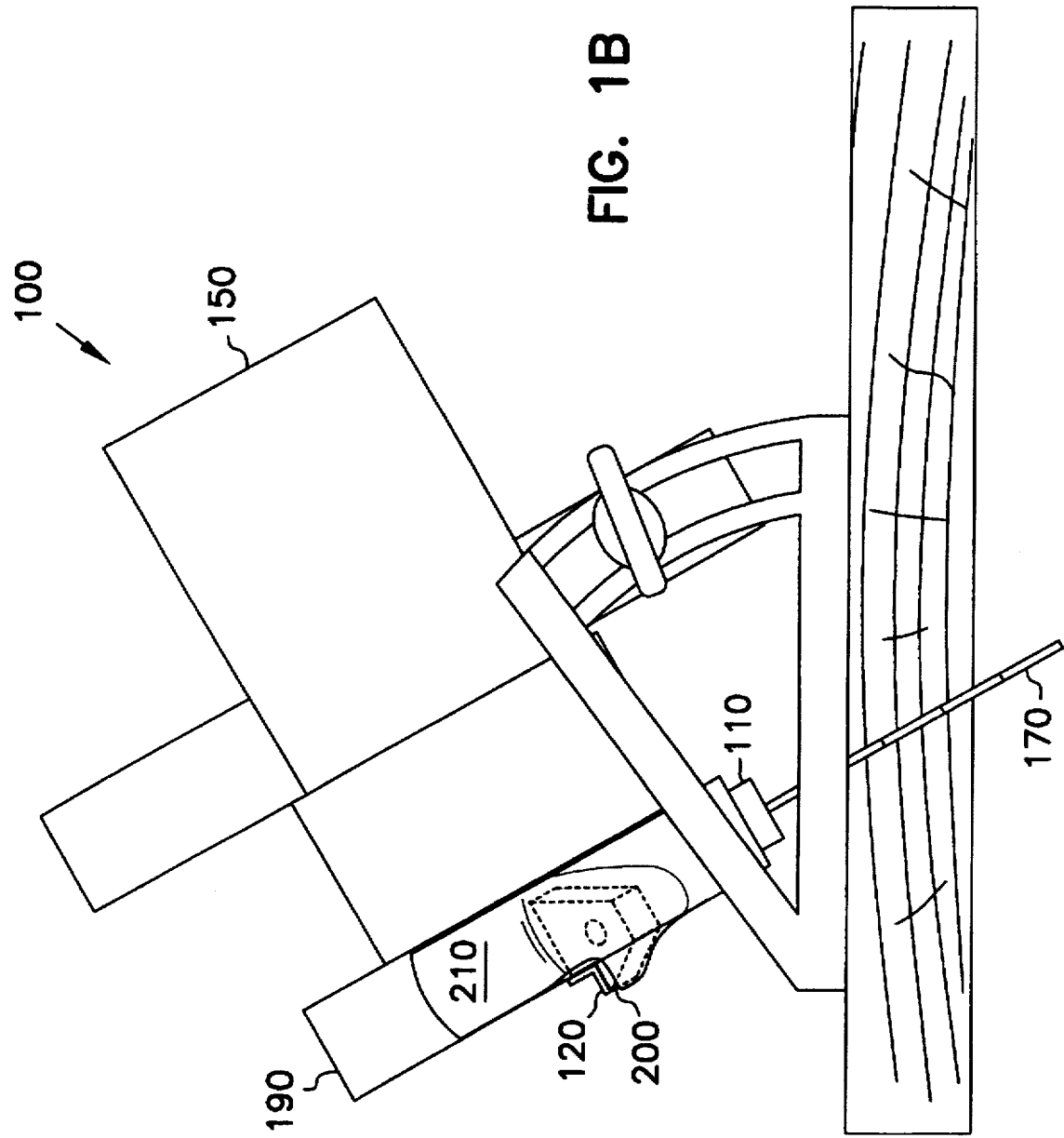

FIG. 1A is a stylized isometric view, and FIG. 1B a front view, of one embodiment of saw 100 showing the present invention. In this embodiment, saw 100 comprises lower saw blade guard ("LSBG") 110 shown in the operating ("retracted") position (as contrasted to the non-operating or "default" position which cover the saw blade 170), lower saw blade guard lever 120 made of ferromagnetic material such as steel, lower saw blade guard holder 130, power on/off switch 140, electric motor 150, base assembly 160, saw blade 170, saw angle adjustment mechanism 180, and upper saw blade guard 190. Before making an angled cut with saw 100, the operator depresses the power on/off switch 140 turning on the electric motor 150. The operator then moves the lower saw blade guard lever 120 up into contact with the lower saw blade guard holder 130. The lower saw blade guard holder 130 attracts and retains the LSBG lever 120, thus holding the lower saw blade guard 110 in the retracted position until the electric power is removed from the motor 150, usually when the operator releases the power on/off switch 140. This allows the operator to use one hand to control and move the saw 100 while a cut is being made, and frees the operator to use his or her other hand for other tasks, such as securing the material being cut or securing the electrical cord, thus increasing safety.

FIGS. 2A, 2B, and 2C are a side, front, and bottom view, respectively, of one embodiment of the lower saw blade guard holder 130 comprising an electromagnet assembly 200 and a mounting assembly 210. Mounting assembly 210 is made of any suitable material such as plastic, non-ferrous metal, or phenolic. In this embodiment, mounting assembly 210 is secured to the upper saw blade guard 190 as seen in FIG. 1A and 1B by conventional means such as rivets or an adhesive, for example, flooring adhesive. In one such embodiment, LSBG holder 130, comprising electromagnet assembly 200 and mounting assembly 210, is marketed as an add-on safety feature which can be added to existing conventional power circular saws, and wired into their power switches. In another embodiment, mounting assembly 210 is integrally a part of upper saw blade guard 190.

FIGS. 3A, 3B, 3C, & 3D are an isometric, top, side, and operational view, respectively, of the electromagnet 200 and its parts. Together, these figures form a drawing of one embodiment of electromagnet assembly 200 used, in one embodiment, for LSBG holder 130. In this embodiment, the electromagnet assembly 200 comprises an upper piece 300, a lower piece 310, potting material 303, wires 315 and 316, a core 320, a wound wire coil 330, and a diode bridge rectifier assembly 340. Upper and lower end pieces 300 and 310, and core 320 are made of suitable ferromagnetic material, such as steel. In one embodiment, diode bridge rectifier assembly 340 is commercially available part number 583-DB104, and is approximately 9/32" by 11/32" by 1/8" in dimension. Wound wire coil 330 is made of wire of the appropriate size and length to handle the electric current the coil 330 is likely to encounter. In this embodiment, coil 330 comprises a cardboard bobbin wound with a coil comprising 7800 turns of 44 gauge (i.e., #44 AWG) enamel insulated wire. In this embodiment, the shapes of pieces 300 and 310 are shown to fit the lower saw blade guard lever 120 seen in FIG. 1; in other embodiments, other shapes may be utilized depending on the configuration of the lower saw blade guard lever 120.

Figure 4:
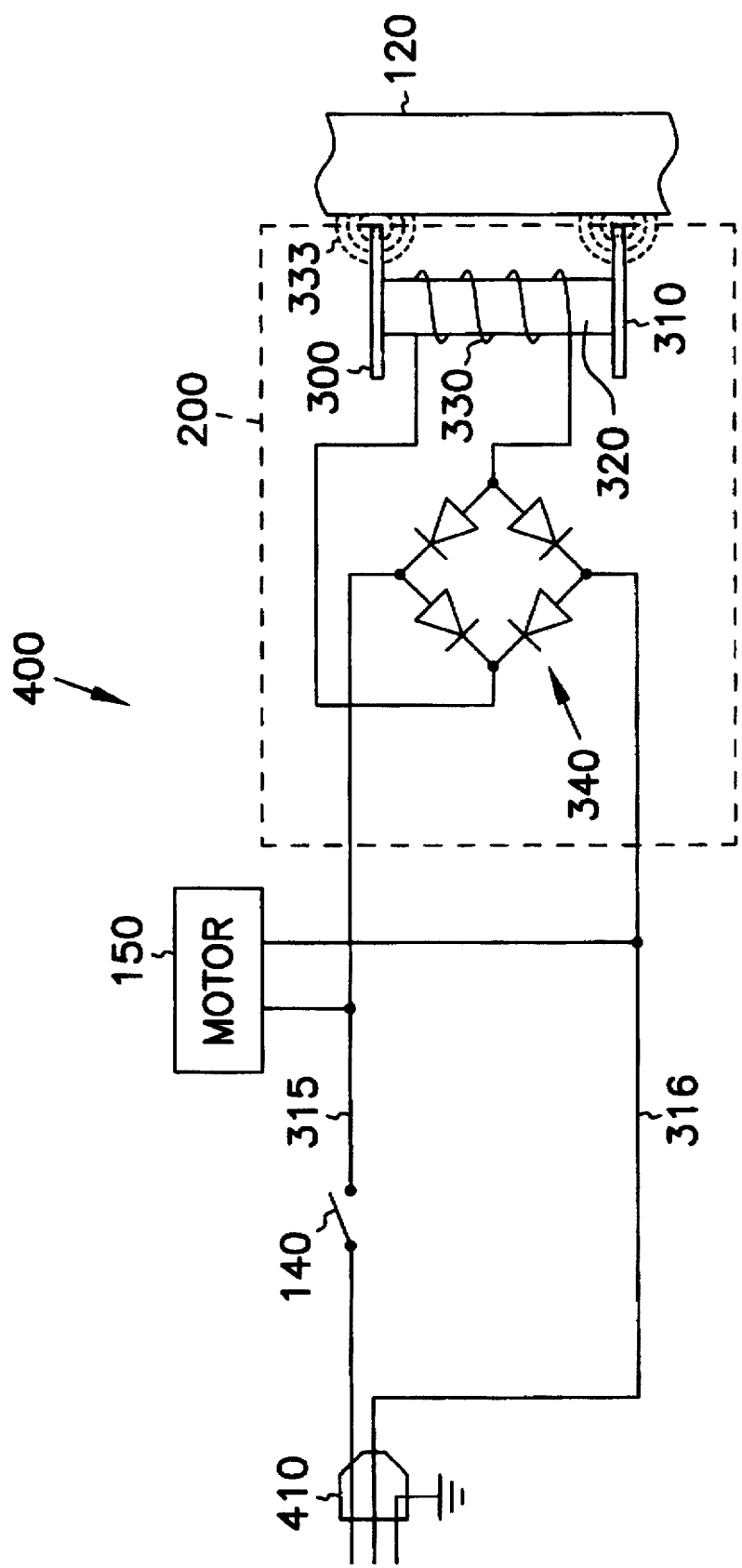
FIG. 4 is a schematic of an electrically powered hand-held circular saw with the electromagnet retention apparatus 200.

FIG. 4 is a schematic of one embodiment of the electrical system of saw 100 seen in FIG. 1. Circuit 400 includes plug 410, power on/off switch 140, motor 150, wires 315 and 316, bridge diode rectifier 340, and coil 330. Coil 330, when powered, induces a magnetic field 333 which extends from core 320, through upper and lower end pieces 300 and 310 and across to LSBG lever 120. When plug 410 is connected to the appropriate power source, such as 120 volts AC in the case of a wall-powered saw, or 12 volts DC in the case of a battery-powered saw, the operator of the saw needs to depress switch 140 to energize the motor 150. The motor 150, being energized, causes the saw blade 170 of FIG. 1 to rotate. Saw blade 170 can be a conventional metal blade having teeth, an abrasive wheel, or any other suitable device for removing unwanted material from a kerf in the material being cut.

In this embodiment when the motor 150 is energized, electrical current is also applied to the electromagnet assembly 200, creating a magnetic field. When the operator moves the lower saw blade guard lever 120 into contact with pieces 300 and 310, a magnetic circuit is completed through the core 320, pieces 300 and 310, and the lower saw blade guard lever 120. This magnetic circuit holds the lower saw blade guard 110 in the retracted position until the electric current is removed from the electromagnet assembly, for example, as a result of the operator releasing the power switch. Upon removal of the electric current, the magnetic circuit is shut off, and the lower saw blade guard lever 120 is released from pieces 300 and 310. The lower saw blade guard 110 then swings down (in one embodiment, this motion is caused by the spring, which is part of most conventional circular power saws, which pulls the lower saw blade guard into the default position) in order to cover the saw blade.

The LSBG holder 130 holds the lower saw blade guard in a fully retracted position while the motor 150 is energized, so that the lower saw blade guard 110 is not pressing down on the material being cut. This alleviates the potential for binding of the material being cut and the saw blade 170.

In one preferred embodiment, the operator, after starting the motor 150 by depressing and holding depressed the power on/off switch 140, swings the lower saw blade guard 110 up, using the LSBG lever 120 until the LSBG lever 120 is in contact with (or quite near) the LSBG holder 130. Since the power on/off switch 140 is activated, power is supplied to LSBG holder 130 and thus LSBG holder 130 attracts LSBG Lever 120. The operator proceeds to make the cut in the material being cut. Upon completion of the cut, the operator releases the power on/off switch 140, which removes the electrical power from the motor 150 and the LSBG holder 130. Upon removal of electrical power, the LSBG holder 130 releases (i.e., stops attracting) the LSBG lever 120. When the LSBG lever 120 is released, the lower saw blade guard 110 moves (in one embodiment, under force provided by a spring) to cover saw blade 170 while saw blade 170 is coasting to a stop after the electrical power was removed from motor 150. In an alternative embodiment, rather than using LSBG lever 120 as the magnetically attractable portion of LSBG 110, another piece of magnetically attractable ferrous metal is attached to LSBG 110 at a suitable location on LSBG 110, and LSBG holder 130 is positioned at a location adjacent to the position corresponding to location of the ferrous metal when LSBG 110 is substantially retracted. Thus, any suitable pair of locations (e.g., one on LSBG 130 and one on upper saw blade guard 190) can be used for the retention apparatus comprising LSBG holder 130 and the piece of ferrous metal.

Without this invention, the operator would have to manually hold the lower saw blade guard 110 retracted using the LSBG lever 120 when the lower saw blade guard 110 does not allow free use of the circular saw; for example, when the saw blade 170 binds on the material being cut during an angled cut, or when the operator is making a pocket cut, or when the operator is making a blind or plunge-cut start in the material to be cut.

Without this invention, the operator would have to use both hands to operate and control the circular saw while performing the cutting operation. The primary benefit of this invention is the safer operating conditions that will exist since the operator has to use only one hand to operate and control the circular saw. The other hand, thus freed, can be used to enhance the operator's safe operation of the circular saw; for example, allowing the other hand to be used to secure the material being cut, or to hold the power cord away from the saw blade. When power is removed from motor 150, the lower saw blade guard 110 moves into the default position of covering the saw blade 170, thus rendering the still rotating saw blade 170 incapable of accidentally cutting the floor, material, people, etc., when the cut is completed and the operator releases the power on/off switch 140 and places the saw on the floor, work surface, bench, etc.

Figure 5:
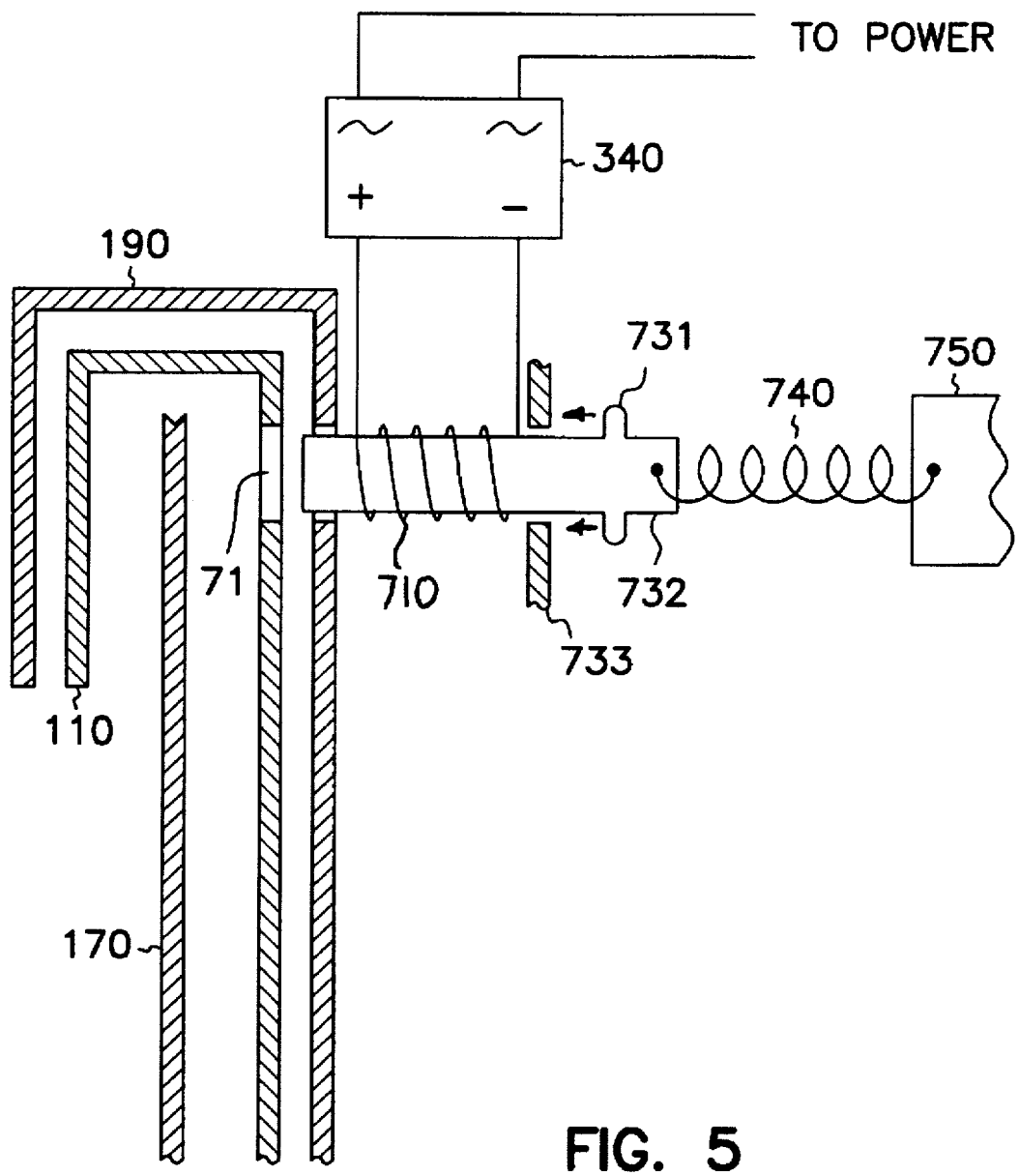
FIG. 5 is an embodiment of the invention showing a electromagnet-plunger mechanism for retaining the lower saw blade guard.

In another embodiment, shown in FIG. 5, a laterally movable plunger 732 in the core of an electromagnet 710 is inserted in a hole 71 in lower saw blade guard 110 to retain the lower saw blade guard 110 in a retracted position while the power on/off switch 140 is activated. Lip 731 and stop 733 keep plunger 732 from traveling too far. Upon release of the power on/off switch 140, the plunger 732 is removed from the lower saw blade guard 110 with the help of spring 740 attached to body 750 of saw 100, and the lower saw blade guard 110 moves to the default position of covering the saw blade 170.

Figure 6:
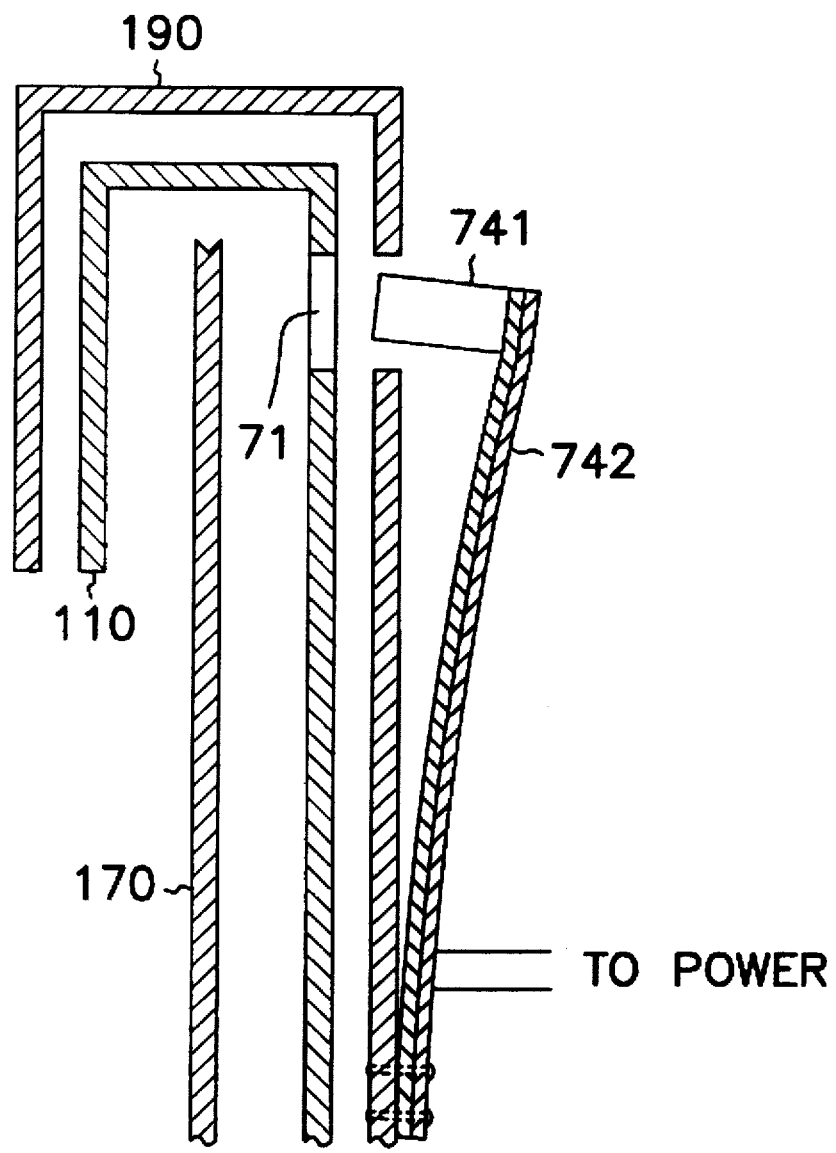
FIG. 6 is an embodiment of the invention showing a bi-metal strip/plunger mechanism for retaining the lower saw blade guard.

In yet another embodiment, shown in FIG. 6, a laterally movable plunger 741, which is moved by bi-metal strip 742, is inserted in a hole 71 in lower saw blade guard 110 to retain the lower saw blade guard 110 in a retracted position while the power on/off switch 140 is activated. In one such embodiment, resistive heating of bi-metal strip 742 is powered by power switch 140. Upon release of the power on/off switch 140, the plunger 741 is removed from the lower saw blade guard 110 by the rapid cooling of bi-metal strip 742, and the lower saw blade guard 110 moves to the default position of covering the saw blade 170.

Figure 7B:
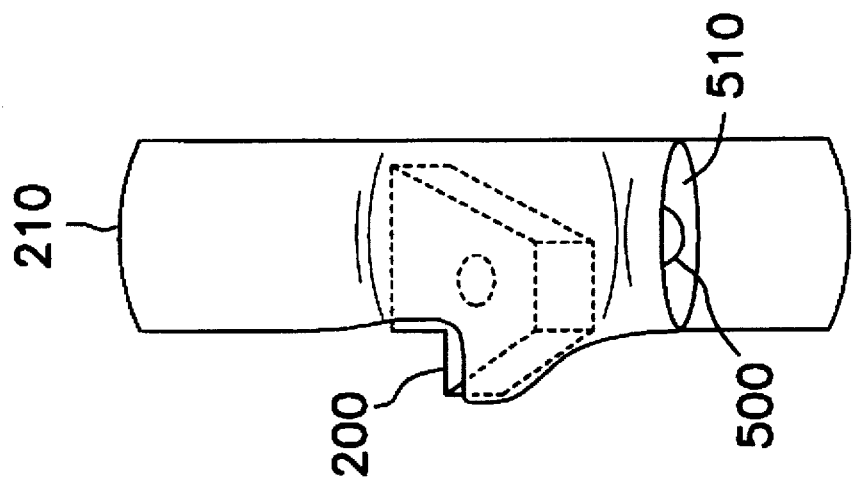
FIGS. 7A & 7B show a side and front view, respectively, of another embodiment showing the addition of a lamp.
Figure 7A:
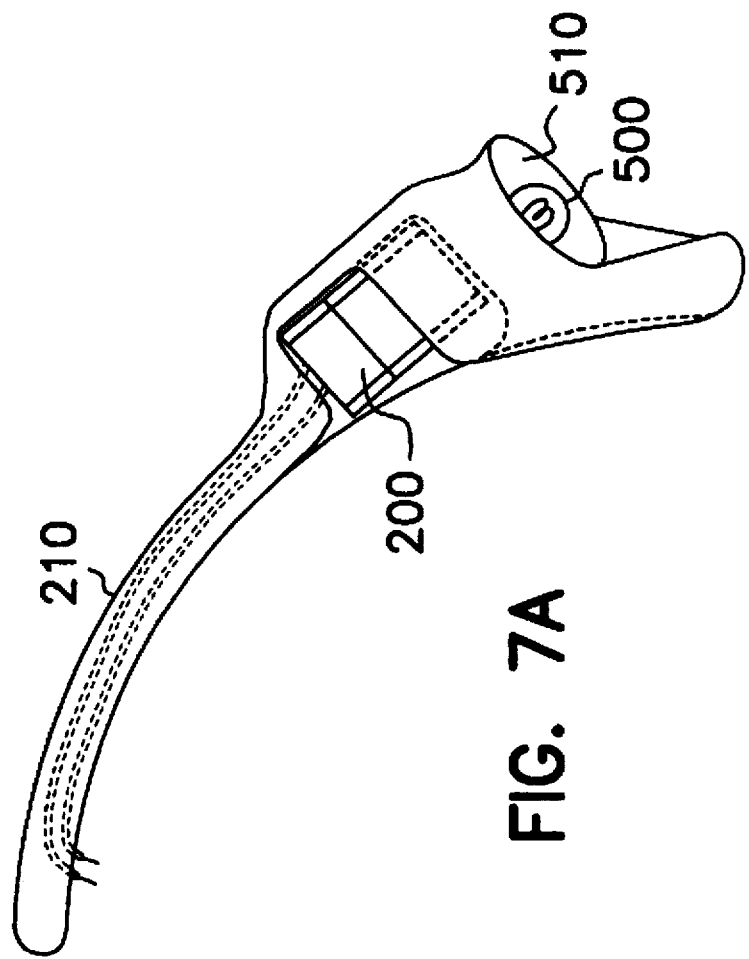
Figure 8:
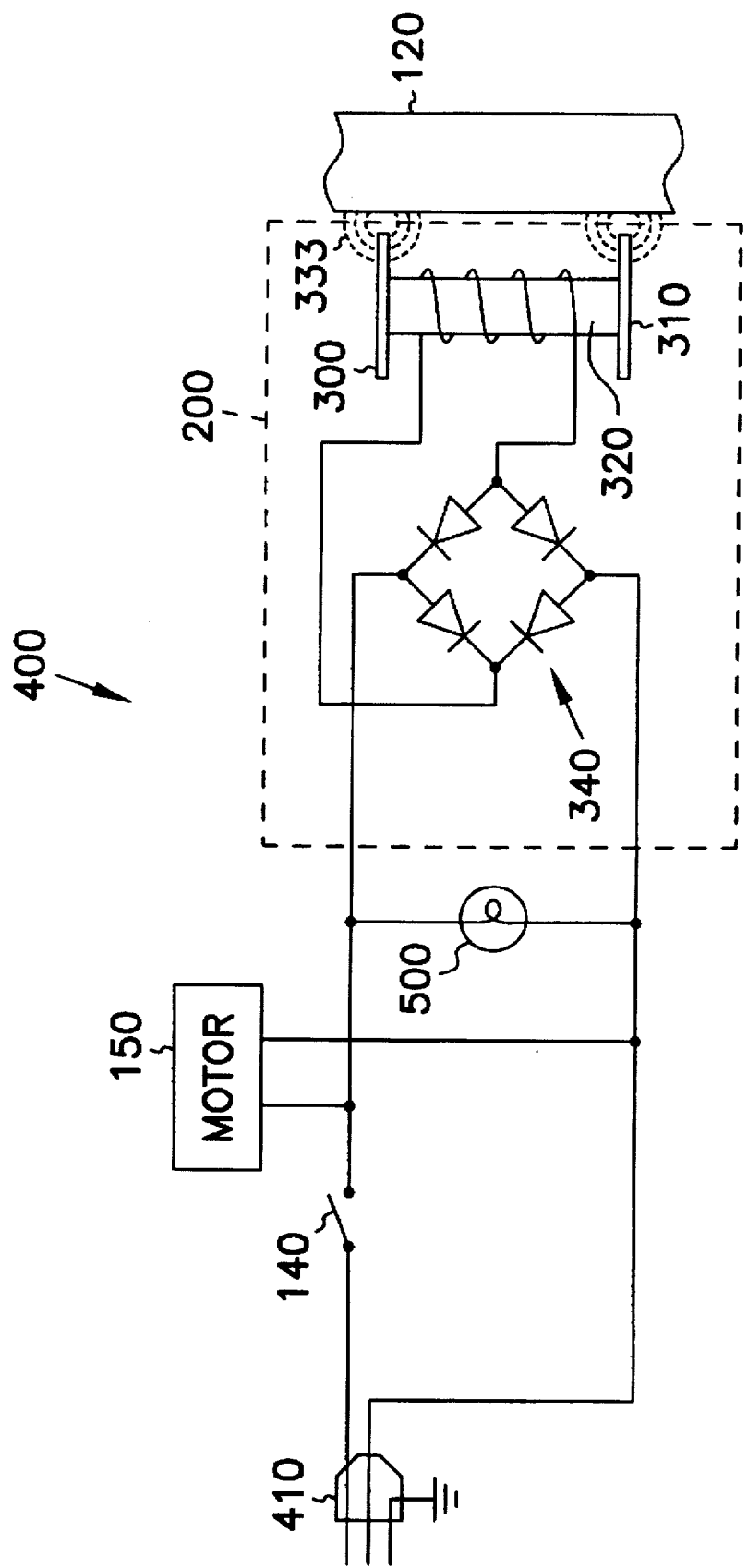
FIG. 8 is a schematic of an electrically powered hand-held circular saw with the electromagnet retention apparatus 200 and light 500.

In one embodiment, shown in FIGS. 7A and 7B, a lamp 500, which directs light on the material being cut, and reflector 510 are incorporated in mounting assembly 210. Lamp 500 helps the operator see a guide line that the operator wants to follow with saw 100. In one embodiment, lamp 500 is wired in parallel to electromagnet assembly 200 so that lamp 500 comes on whenever electromagnet assembly 200 is powered, i.e., when power on/off switch 140 is depressed and held depressed. In another embodiment, lamp 500 has a separate power switch so that lamp 500 can be powered on/off independent of power on/off switch 140. FIG. 8 is a schematic of such an embodiment of the lower saw blade guard holder as shown in FIG. 4, but further comprising a lamp 500.

Figure 9:
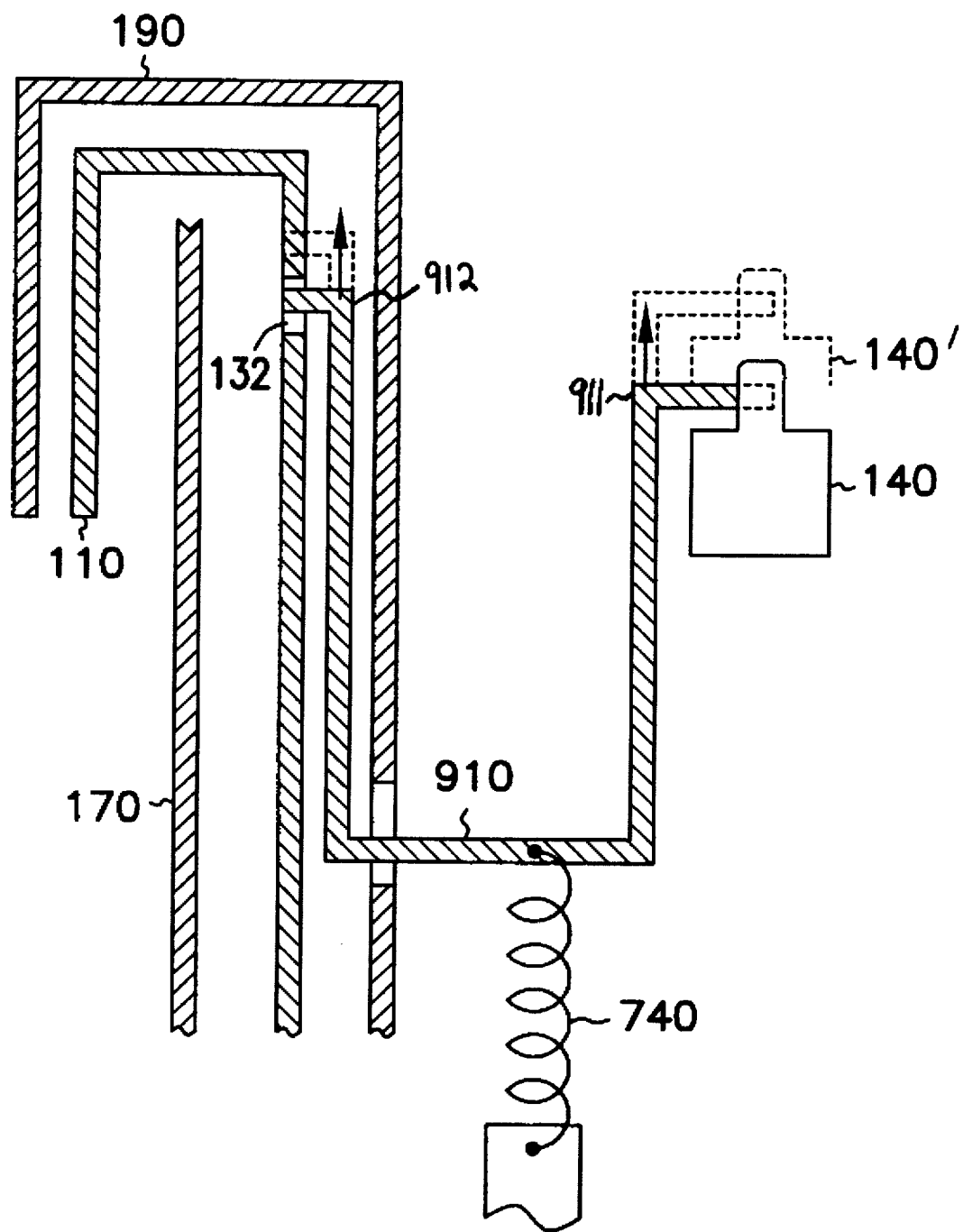
FIG. 9 is a cutaway front view of another embodiment comprising a mechanical linkage for retaining the lower saw-blade guard.

In yet another embodiment, schematically shown in FIG. 9, a lower saw blade guard retention apparatus comprises a mechanical lever which retains the lower saw blade guard in a retracted position. The mechanical lever is mechanically coupled to the power on/off switch 140, so that when the power on/off switch 140 is activated (e.g., moved upward to the 140' position shown in dotted lines), the lower saw blade guard 110 is held retracted by rod 910, and when the power on/off switch 140 is deactivated, the lower saw blade guard 110 is allowed to return to the default position of covering the saw blade 170. In the embodiment shown in FIG. 9, the mechanical lever is a movable formed-metal rod 910 (having a first end 911 and a second end 912) is mechanically coupled to power on/off switch 140 on its first end 911, follows the contours of the saw 100 to second end 912 located at a place adjacent to LSBG 110 inside upper saw-blade guard 190. In this embodiment, LSBG 110 has a hole, lip, or edge 132 which, when LSBG 110 is fully retracted, corresponds to the "activated" position of the second end 912 of metal rod 910. Thus, when power on/off switch 140 is activated (moved upward to the 140' position), rod 910 is moved upwards, thus engaging edge 132 when LSBG 110 is fully retracted, and holding LSBG 110 in that position as long as switch 140 is held, and releasing LSBG 110 as soon as switch 140 is released. Spring 740 is included in this embodiment in order to help return metal rod 910 to its default position which in turn allows LSBG 110 to return to the default position of covering the saw blade 170.

In an alternate embodiment (not shown), LSBG holder 130, rather than directly securing the LSBG lever 120 by magnetic attraction as in FIG. 3A or purely mechanically as in FIG. 9, instead operates any known electro-mechanical mechanism (e.g., one which relies on an electro-magnet to move a lever, or electrical heating to shorten a length of wire, in order to electrically induce a mechanical movement operation) that does the securing of the lower saw blade guard in the retracted position. In one such embodiment, a lower saw blade guard retention apparatus comprises a electro-mechanical lever which retains the lower saw blade guard in a retracted position. The electro-mechanical lever is electrically coupled to the power on/off switch 140, so that when the power on/off switch 140 is activated, the lower saw blade guard 110 is held retracted, and when the power on/off switch is deactivated, the lower saw blade guard 110 is allowed to return to the default position of covering the saw blade 170.

In another embodiment, the retention apparatus can be activated before power is applied to motor 150, thus retaining LSBG 110 in the retracted position before power is applied and during the period when power is applied, and then releasing LSBG 110 at the moment power is removed. In one such embodiment (not shown), a two-part latch mechanism is used, wherein a first mechanical spring latch is activated by the user moving LSBG 110 into the retracted position manually. At a later point in time, the operator applies power to electric motor by activating power on/off switch 140, which releases the first mechanical spring latch and also activates a second retention apparatus (e.g., any of the above described retention apparatus, such as LSBG holder 130) which maintains LSBG 110 in the retracted position as long as power on/off switch 140 is depressed, but releases LSBG 110 as soon as switch 140 is released.

It is to be understood that the above description is intended to be illustrative, and not restrictive. Many other embodiments will be apparent to those of skill in the art upon reviewing the above description. For example, FIG. 1 shows the LSBG holder 130 in a position to hold the LSBG lever 120, the LSBG holder 130 could be made to attract a piece of ferromagnetic material placed in a different position on the lower saw blade guard, such as at the opposite end of the lower saw blade guard 110 form where the LSBG lever is shown. The scope of the invention should, therefore, be determined with reference to the appended claims, along with the full scope of equivalents to which such claims are entitled.

What is claimed is:

1. A retention apparatus for an electrically powered hand-held circular saw, the circular saw having a retractable lower saw blade guard, a saw blade, a saw-blade motor for rotating the saw blade, and a power on/off switch that Supplies electrical power to the saw-blade motor when activated, the retention apparatus comprising:

a lower saw blade guard (LSBG) holder coupled to the power on/off switch wherein the LSBG holder engages the lower saw blade guard only when the lower saw blade guard is in a substantially retracted position and maintains the lower saw blade guard in the retracted position when power is applied to the motor, and releases the lower saw blade guard to allow the lower saw blade guard to return to a default position of covering the saw blade when power is not applied to the motor.

2. The retention apparatus for an electrically powered hand-held circular saw according to claim 1, wherein the lower saw blade guard holder comprises an electromagnet which is activated when the power on/off switch is activated and deactivated when the power on/off switch is deactivated.

3. The retention apparatus for an electrically powered hand-held circular saw according to claim 2, wherein the retractable lower saw blade guard comprises a ferromagnetic section which comes substantially in contact with the electromagnet when the lower saw blade guard is substantially retracted.

4. The retention apparatus for an electrically powered hand-held circular saw according to claim 2, wherein the electromagnet comprises a single winding about a single core.

5. The retention apparatus for an electrically powered hand-held circular saw according to claim 2, wherein the lower saw blade guard holder further comprises a lamp that directs light on a material being cut by the circular saw including substantial illumination on material on both sides of an expected saw kerf.

6. The retention apparatus for an electrically powered hand-held circular saw according to claim 1, wherein the lower saw blade guard holder comprises a mechanical latch mechanically coupled to the power on/off switch that retains the lower saw blade guard in the retracted position as long as the power on/off switch is activated, and releases the lower saw blade guard when the power on/off switch is deactivated.

7. The retention apparatus according to claim 1, wherein the lower saw blade guard holder comprises of an electro-mechanical mechanism which is activated when the power on/off switch is activated and deactivated when the power on/off switch is deactivated.

8. The retention apparatus according to claim 1, wherein the lower saw blade guard holder comprises of a mechanical mechanism which is activated when the power on/off switch is activated and deactivated when the power on/off switch is deactivated.

9. An electrically powered hand-held circular saw comprising:
 a retractable lower saw blade guard;
 a saw blade;
 a saw-blade motor for rotating the saw blade;
 a power on/off switch that supplies electrical power to the saw-blade motor when activated; and
 a retention apparatus, the retention apparatus comprising:
  a lower saw blade guard (LSBG) holder coupled to the power on/off switch wherein the LSBG holder engages the lower saw blade guard only when the lower saw blade guard is in a substantially retracted position and maintains the lower saw blade guard in the retracted position when power is applied to the motor, and releases the lower saw blade guard to allow the lower saw blade guard to return to a default position of covering the saw blade when power is not applied to the motor.

10. The electrically powered hand-held circular saw according to claim 9, wherein the lower saw blade guard holder comprises an electromagnet which is activated when the power on/off switch is activated and deactivated when the power on/off switch is deactivated. guard in the retracted position when power is applied to the motor, and releases the lower saw blade guard to allow the lower saw blade guard to return to a default position of covering the saw blade when power is not applied to the motor.

11. The electrically powered hand-held circular saw according to claim 10, wherein the retractable lower saw blade guard comprises a ferromagnetic section which comes substantially in contact with the electromagnet when the lower saw blade guard is substantially retracted.

12. The electrically powered hand-held circular saw according to claim 10, further comprising a lamp that directs light on a material being cut by the circular saw including substantial illumination on material on both sides of an expected saw kerf.

13. The electrically powered hand-held circular saw according to claim 9, wherein the lower saw blade guard holder comprises a mechanical latch mechanically coupled to the power on/off switch that retains the lower saw blade guard in the retracted position as long as the power on/off switch is activated, and releases the lower saw blade guard when the power on/off switch is deactivated.

14. The electrically powered hand-held circular saw according to claim 9, wherein the lower saw blade guard holder comprises of an electro-mechanical mechanism which is activated when the power on/off switch is activated and deactivated when the power on/off switch is deactivated.

15. The electrically powered hand-held circular saw according to claim 9, wherein the lower saw blade guard holder comprises of a mechanical mechanism which is activated when the power on/off switch is activated and deactivated when the power on/off switch is deactivated.

16. A method for holding a retractable lower saw blade guard of an electrically powered hand-held circular saw, the circular saw having a motor and a power on/off switch, the lower saw blade guard having a lever for manually urging the lower saw blade guard to a substantially retracted position the method comprising the steps of:
 engaging the lower saw blade guard only when the lower saw blade guard is in a substantially retracted position and holding the lower saw blade guard in the substantially retracted position with a retention mechanism for as long as the power on/off switch is activated to apply power to the motor; and
 automatically releasing the lower saw blade guard when power is not applied to the motor.

17. The method according to claim 16, wherein the step of holding comprises the step of electro-magnetically holding the lower saw blade guard, and the step of releasing comprises the step of electro-magnetically releasing the lower saw blade guard.

18. The method according to claim 17, wherein the step electro-magnetically holding the lower saw blade guard comprises holding a ferromagnetic section only when the lower saw blade guard is substantially retracted.

19. The method according to claim 17, further comprising the step of lighting a material being cut by the circular saw when the power on/off switch is activated.

20. The method according to claim 16, wherein the step of holding comprises the step of mechanically holding the lower saw blade guard, and the step of releasing comprises the step of mechanically releasing the lower saw blade guard when the power on/off switch is deactivated.

* * * * *

UNITED STATES PATENT AND TRADEMARK OFFICE
CERTIFICATE OF CORRECTION

PATENT NO. : 5,699,705
DATED : December 23, 1997
INVENTOR(S) : Donald Dale Sibbet

It is certified that error appears in the above-identified patent and that said Letters Patent is hereby corrected as shown below:

On the title page: Item [54] and Column 1, line 1,

Title, please insert "HAVING" after "SAW" and before "RETENTION".

At [73], Assignee, please insert --Donald Dale Sibbet and Paul Mark Petersen--.

After "Assistant Examiner--Sean A. Pryor" please insert --Attorney, Agent or Firm--Schwegman, Lundberg, Woessner & Kluth, P.A.--.

At Col. 6, line 55, claim 1, please delete "Supplies" and insert --supplies--.

At Col. 7, line 61 to Col. 8, line 3, claim 10, please delete --guard in the retracted position when power is applied to the motor, and releases the lower aw blade guard to allow the lower saw blade guard to return to a default position of covering the saw blade when power is not applied to the motor.--.

Signed and Sealed this

Twenty-seventh Day of April, 1999

*Attest:*

Q. TODD DICKINSON

*Attesting Officer*   *Acting Commissioner of Patents and Trademarks*